United States Patent
Du et al.

(10) Patent No.: US 11,153,028 B2
(45) Date of Patent: Oct. 19, 2021

(54) GRANT-FREE TRANSMISSION METHOD, TERMINAL, AND NETWORK DEVICE

(71) Applicant: Huawei Technologies Co., Ltd., Shenzhen (CN)

(72) Inventors: Yinggang Du, Shenzhen (CN); Yan Chen, Shanghai (CN); Xiuqiang Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,377

(22) Filed: May 1, 2019

(65) Prior Publication Data

US 2019/0260499 A1 Aug. 22, 2019

Related U.S. Application Data

(63) Continuation of application No. PCT/CN2017/103180, filed on Sep. 25, 2017.

(30) Foreign Application Priority Data

Nov. 4, 2016 (CN) .......................... 201610981620.7

(51) Int. Cl.
*H04L 1/00* (2006.01)
*H04L 5/00* (2006.01)
(Continued)

(52) U.S. Cl.
CPC ............ *H04L 1/0003* (2013.01); *H04L 5/005* (2013.01); *H04W 52/146* (2013.01);
(Continued)

(58) Field of Classification Search
CPC .... H04L 1/0003; H04L 5/005; H04W 52/146; H04W 72/04; H04W 72/042;
(Continued)

(56) References Cited

U.S. PATENT DOCUMENTS 9,100,161 B2 * 8/2015 Wager .................. H04L 5/0007
9,112,760 B2 * 8/2015 Atungsiri ............... H04L 27/01
(Continued)

FOREIGN PATENT DOCUMENTS

| CN | 101431490 A | 5/2009 |
| CN | 104838713 A | 8/2015 |

(Continued)

OTHER PUBLICATIONS

3rd Generation Partnership Project (3GPP), Study on New Radio (NR) Access Technology, Physical Layer Aspects, Aug. 2016, 3GPP, 3GPP TR 38.802, Version 0.1.0, Release 14 (Year: 2016).*

(Continued)

*Primary Examiner* — Eric Nowlin
(74) *Attorney, Agent, or Firm* — Slater Matsil, LLP

(57) ABSTRACT

A grant-free transmission method, a terminal, and a network device are disclosed. In an embodiment, a grant-free transmission method includes sending, by a network device, information about P dedicated transmission resources used for grant-free transmission to a terminal, wherein P is a positive integer and P≥2, detecting, by the network device, a dedicated transmission resource, and detecting, by the network device, data based on a transmission parameter set corresponding to the dedicated transmission resource when grant-free transmission is detected.

24 Claims, 5 Drawing Sheets

(51) Int. Cl.
*H04W 52/14* (2009.01)
*H04W 72/08* (2009.01)
*H04W 72/04* (2009.01)
*H04W 74/08* (2009.01)

(52) U.S. Cl.
CPC .......... *H04W 72/04* (2013.01); *H04W 72/087* (2013.01); *H04W 74/08* (2013.01); *H04W 72/042* (2013.01)

(58) Field of Classification Search
CPC ........... H04W 72/0446; H04W 72/087; H04W 74/08; H04W 74/0808
See application file for complete search history.

(56) References Cited

U.S. PATENT DOCUMENTS

| | | | |
|---|---|---|---|
| 9,641,376 B2* | 5/2017 | Atungsiri | H04L 27/2649 |
| 10,027,372 B2* | 7/2018 | Gorokhov | H04B 1/7103 |
| 10,250,425 B2* | 4/2019 | Atungsiri | H04L 27/3488 |
| 10,425,942 B2* | 9/2019 | Ahn | H04L 1/1819 |
| 10,560,300 B2* | 2/2020 | Atungsiri | H04L 27/01 |
| 10,630,518 B2* | 4/2020 | Park | H04B 7/0604 |
| 10,735,992 B2* | 8/2020 | Park | H04W 48/16 |
| 10,833,813 B2* | 11/2020 | Lei | H04L 1/1896 |
| 2013/0034071 A1 | 2/2013 | Lee et al. | |
| 2013/0170535 A1* | 7/2013 | Atungsiri | H04L 5/0007 375/229 |
| 2014/0192767 A1 | 7/2014 | Au et al. | |
| 2014/0254544 A1 | 9/2014 | Kar Kin Au et al. | |
| 2015/0289292 A1 | 10/2015 | Sun et al. | |
| 2015/0349998 A1* | 12/2015 | Atungsiri | H04L 27/2627 375/229 |
| 2016/0119022 A1* | 4/2016 | Gorokhov | H04B 1/7103 455/63.1 |
| 2016/0323911 A1 | 11/2016 | Au et al. | |
| 2017/0279651 A1* | 9/2017 | Atungsiri | H04L 27/2649 |
| 2018/0035406 A1* | 2/2018 | Hao | H04L 5/0046 |
| 2018/0146474 A1 | 5/2018 | Luo et al. | |
| 2018/0249374 A1* | 8/2018 | Park | H04J 11/00 |
| 2018/0337810 A1* | 11/2018 | Park | H04L 5/0076 |
| 2019/0090240 A1* | 3/2019 | Ahn | H04W 72/0413 |
| 2019/0173608 A1 | 6/2019 | Wu et al. | |
| 2019/0222459 A1* | 7/2019 | Atungsiri | H04L 27/2649 |
| 2019/0319762 A1* | 10/2019 | Zhang | H04L 5/0091 |
| 2020/0028628 A1* | 1/2020 | Lei | H04L 1/1819 |
| 2020/0127778 A1* | 4/2020 | Zhuang | H04L 5/0007 |

FOREIGN PATENT DOCUMENTS

| | | |
|---|---|---|
| CN | 104981022 A | 10/2015 |
| CN | 105284172 A | 1/2016 |
| JP | 2016514416 A | 5/2016 |
| WO | 2015137632 A1 | 9/2015 |

OTHER PUBLICATIONS

Huawei et al., Discussion on grant-free transmission, Aug. 22, 2016, 3GPP TSG RAN WG1 Meeting #86, Tdoc: R1-166095 (Year: 2016).*
ZTE et al., Discussion on Grant-Free Concept for UL mMTC, Aug. 22, 2016, 3GPP TSG RAN WG1 Meeting #86, Tdoc: R1-166405 (Year: 2016).*
Samsung, Discussion on grant-free/contention-based non-orthogonal multiple access, Aug. 22, 2016, 3GPP TSG RAN WG1 Meeting #86, Tdoc: R1-166752 (Year: 2016).*
NTT DOCOMO, Inc., Discussion on Multiple Access for UL mMTC, Aug. 22, 2016, 3GPP TSG RAN WG1 Meeting #86, Tdoc: R1-167392 (Year: 2016).*
LG Electronics et al., Way Forward on SLS Assumptions for Autonomous/Grant-Free/Contention-Based MA, Aug. 22, 2016, 3GPP TSG RAN WG1 #86, Tdoc: R1-168115 (Year: 2016).*
ZTE et al., WF on Clarification of Grant-free Transmission for mMTC, Aug. 22, 2016, 3GPP TSG RAN WG1 #86, Tdoc: R1-168257 (Year: 2016).*
LG Electronics et al., WF on Some Definition of Terminologies for "Autonomous/Grant-Free/Contention-Based" MA, Aug. 22, 2016, 3GPP TSG RAN WG1 #86, Tdoc: R1-168423 (Year: 2016).*
Huawei et al., WF on Definition of UL Grant-Free Resource, Aug. 22, 2016, 3GPP TSG RAN WG1 #86, Tdoc: R1-168426 (Year: 2016).*
Huawei et al., WF on Study of UL Grant-Free, Aug. 22, 2016, 3GPP TSG RAN WG1 #86, Tdoc: R1-168428 (Year: 2016).*
LG Electronics et al., WF on Further Clarification on Grant-Free Transmission for mMTC, Aug. 22, 2016, 3GPP TSG RAN WG1 #86, Tdoc: R1-168538 (Year: 2016).*
CATT, Consideration on Grant-Free Transmission, Oct. 10, 2016, 3GPP TSG RAN WG1 Meeting #86bis, Tdoc: R1-1608757 (Year: 2016).*
Fujitsu, Discussion on Grant-Free Transmission for UL Multiple Access, Oct. 10, 2016, 3GPP TSG RAN WG1 Meeting #86bis, Tdoc: R1-1608803 (Year: 2016).*
Huawei et al., The Retransmission and HARQ Schemes for Grant-Free, Oct. 10, 2016, 3GPP TSG RAN WG1 Meeting #86bis, Tdoc: R1-1608859 (Year: 2016).*
Huawei et al., Solutions for Collisions of MA Signatures, Oct. 10, 2016, 3GPP TSG RAN WG1 Meeting #86bis, Tdoc: R1-1608860 (Year: 2016).*
Huawei et al., Resource Allocation and Management for Grant-Free UL, Oct. 10, 2016, 3GPP TSG RAN WG1 Meeting #86bis, Tdoc: R1-1608861 (Year: 2016).*
Huawei et al., Grant-Free Non-Orthogonal MA for Uplink URLLC, Oct. 10, 2016, 3GPP TSG RAN WG1 Meeting #86bis, Tdoc: R1-1608869 (Year: 2016).*
Spreadtrum Communications, Considerations on Pre-Configured Resource for Grant-Free Based UL Non-Orthogonal MA, Oct. 10, 2016, 3GPP TSG RAN WG1 Meeting #86bis, Tdoc: R1-1608919 (Year: 2016).*
ZTE et al., Considerations on the Preamble Design for Grant-Free Non-Orthogonal MA, Oct. 10, 2016, 3GPP TSG RAN WG1 Meeting #86bis, Tdoc: R1-1608955 (Year: 2016).*
Samsung, Discussion on Grant-Free Based Multiple Access, Oct. 10, 2016, 3GPP TSG RAN WG1 Meeting #86bis, Tdoc: R1-1609037 (Year: 2016).*
Samsung, Collision Analysis of Grant-Free Based Multiple Access, Oct. 10, 2016, 3GPP TSG RAN WG1 Meeting #86bis, Tdoc: R1-1609038 (Year: 2016).*
Samsung, Support of HARQ in Grant-Free Based Multiple Access, Oct. 10, 2016, 3GPP TSG RAN WG1 Meeting #86bis, Tdoc: R1-1609039 (Year: 2016).*
LG Electronics, Discussion on Feedback Signaling for Grant-Free MA, Oct. 10, 2016, 3GPP TSG RAN WG1 Meeting #86bis, Tdoc: R1-1609226 (Year: 2016).*
LG Electronics, On MA Resource and MA Signature Configurations, Oct. 10, 2016, 3GPP TSG RAN WG1 Meeting #86bis, Tdoc : R1-1609227 (Year: 2016).*
LG Electronics, General Procedures for Grant-Free/Grant-Based MA, Oct. 10, 2016, 3GPP TSG RAN WG1 Meeting #86bis, Tdoc: R1-1609228 (Year: 2016).*
Lenovo, Uplink Grant-Free Access for 5G mMTC, Oct. 10, 2016, 3GPP TSG RAN WG1 Meeting #86bis, Tdoc: R1-1609398 (Year: 2016).*
Lenovo, Discussion on Grant-Free Based UL Transmission, Oct. 10, 2016, 3GPP TSG RAN WG1 Meeting #86bis, Tdoc: R1-1609399 (Year: 2016).*
Lenovo, Discussion on Retransmission Design for Grant-Free Based UL Transmission, Oct. 10, 2016, 3GPP TSG RAN WG1 Meeting #86bis, Tdoc: R1-1609400 (Year: 2016).*
Huawei et al., Reference Signal Design for UL Grant-Free Transmission, Oct. 10, 2016, 3GPP TSG RAN WG1 Meeting #86bis, Tdoc: R1-1609446 (Year: 2016).*
Intel Corporation, Grant-Free UL Transmissions in NR, Oct. 10, 2016, 3GPP TSG RAN WG1 Meeting #86bis, Tdoc: R1-1609499 (Year: 2016).*

(56) References Cited

OTHER PUBLICATIONS

Intel Corporation, Retransmissions and Repetitions for UL Grant-Free NOMA Schemes, Oct. 10, 2016, 3GPP TSG RAN WG1 Meeting #86bis, Tdoc: R1-1609502 (Year: 2016).*

Nokia et al., On MA Resources for Grant-Free Transmission, Oct. 10, 2016, 3GPP TSG RAN WG1 Meeting #86bis, Tdoc: R1-1609647 (Year: 2016).*

Nokia et al., Collision Handling for Grant-Free, Oct. 10, 2016, 3GPP TSG RAN WG1 Meeting #86bis, Tdoc: R1-1609648 (Year: 2016).*

Nokia et al., Grant-Free Retransmission with Diversity and Combining for NR, Oct. 10, 2016, 3GPP TSG RAN WG1 Meeting #86bis, Tdoc: R1-1609649 (Year: 2016).*

Nokia et al., Link Adaptation for Grant-Free Transmissions, Oct. 10, 2016, 3GPP TSG RAN WG1 Meeting #86bis, Tdoc: R1-1609654 (Year: 2016).*

Nokia et al., Transmission Options for the mMTC Grant-Free Uplink, Oct. 10, 2016, 3GPP TSG RAN WG1 Meeting #86bis, Tdoc: R1-1609783 (Year: 2016).*

ZTE, Discussion on Grant-Free Transmision Based on Sensing, Oct. 10, 2016, 3GPP TSG RAN WG1 Meeting #86bis, Tdoc: R1-1609801 (Year: 2016).*

Interdigital Communications, Considerations on UL Grant-Free Transmissions for mMTC, Oct. 10, 2016, 3GPP TSG RAN WG1 Meeting #86bis, Tdoc: R1-1609893 (Year: 2016).*

Intel Corporation, Support of Link Adaptation for UL Grant-Free NOMA Schemes, Oct. 10, 2016, 3GPP TSG RAN WG1 Meeting #86bis, Tdoc: R1-1610374 (Year: 2016).*

Huawei et al., WF on Support of UL Grant-Free, Oct. 10, 2016, 3GPP TSG RAN WG1 Meeting #86bis, Tdoc: R1-1610529 (Year : 2016).*

Huawei et al., WF on Summary of Grant-Free Progress, Oct. 10, 2016, 3GPP TSG RAN WG1 Meeting #86bis, Tdoc: R1-1610746 (Year: 2016).*

Huawei et al., WF on UL Grant-Free Technical Aspects, Oct. 10, 2016, 3GPP TSG RAN WG1 Meeting #86bis, Tdoc: R1-1610794 (Year: 2016).*

ZTE et al., WFon Observation of MA Signature, Oct. 10, 2016, 3GPP TSG RAN WG1 Meeting #86bis, Tdoc: R1-1610801 (Year: 2016).*

Huawei et al., WF on Summary of Grant-Free Progress, Oct. 10, 2016, 3GPP TSG RAN WG1 Meeting #86bis, Tdoc: R1-1610826 (Year: 2016).*

Huawei, et al., "Reference signal design for UL grant-free transmission", 3GPP TSG RAN WG1 Meeting #86bis, R1-1609446, Lisbon, Portugal, Oct. 10-14, 2016, total 4 pages.

Yufeng Wang, et al., "Sparse Bayesian Learning Based User Detection and Channel Estimation for SCMA Uplink Systems", 2015 International Conference on Wireless Communications and Signal Processing (WCSP), total 5 pages.

Huawei, et al. "Discussion on grant-free transmission", 3GPP TSG RAN WG1 Meeting #86, R1-166095, Gothenburg, Sweden, Aug. 22-26, 2016, 5 pages.

Samsung, "Discussion on grant-free/contention-based non-orthogonal multiple access", 3GPP TSG RAN WG1 Meeting #86, R1-166752, Gothenburg, Sweden, Aug. 22-26, 2016, 5 pages.

* cited by examiner

GRANT-FREE TRANSMISSION METHOD, TERMINAL, AND NETWORK DEVICE

CROSS-REFERENCE TO RELATED APPLICATIONS

This application is a continuation of International Patent Application No. PCT/CN2017/103180, filed on Sep. 25, 2017, which claims priority to Chinese Patent Application No. 201610981620.7, filed on Nov. 4, 2016. The disclosures of the aforementioned applications are hereby incorporated by reference in their entireties.

TECHNICAL FIELD

The present invention relates to the communications field, and in particular, to a grant-free transmission method, a terminal, and a network device in the communications field.

BACKGROUND

A future 5G communications system needs to support a wide variety of terminals. To reduce energy consumption of a terminal, it is an inevitable choice to keep the terminal in a power-saving state and reduce signal interworking processes. Therefore, in the 5G communications system, a new state is introduced, which may be referred to as an economy or energy conservative operation (ECO) state or a radio resource control (RRC) inactive state (RRC Inactive state) herein. If the terminal is in an ECO state, the terminal does not interact with a network when there is no data to be transmitted. Therefore, the terminal neither maintains an air interface connection to the network, nor is in an uplink synchronization state. The introduced ECO state is applicable to grant-free transmission.

Grant-free transmission can resolve various services in a future network, for example, a machine type communication (MTC" for short) service or an ultra-reliable and low-latency communications (URLLC) service, to meet low-latency and high-reliability service transmission requirements. Grant-free transmission may be specific to uplink data transmission. Grant-free transmission may also be referred to as another name, such as spontaneous access, spontaneous multiple access, or contention-based multiple access.

Grant-free transmission means that a network does not need to perform real-time resource scheduling for data transmission of a terminal, and the network device broadcasts a time-frequency resource and a pilot resource used for grant-free transmission. When a plurality of terminals needs to transmit data at the same time, the terminals usually randomly select a pilot in a contention-based manner and randomly select a pre-configured resource to transmit the data. In other words, the plurality of terminals performs contention-based transmission on a same resource, and pilot collision may occur, affecting transmission correctness and causing more delays. Therefore, in a grant-free transmission mode, a latency-insensitive service that requires reliable transmission is relatively easy to process. However, for a URLLC service, such as vehicle to vehicle (V2V) communication, if collision occurs in this case, transmission may be unreliable, retransmission may be caused, and a transmission delay may be excessively large and cannot meet a requirement. This may lead to a serious consequence. Therefore, to ensure reliable transmission and ensure that an advantage of a shorter delay brought by omitting resource allocation in grant-free transmission is used, a terminal with a URLLC requirement usually uses a trade-off manner. To be specific, no specific time-frequency resource is allocated to the terminal according to characteristics of grant-free transmission, but a pilot dedicated to the terminal is allocated to the terminal when an ECO state is established and configured. In this way, when needing to perform uplink transmission, the terminal transmits the dedicated pilot and corresponding data. Once a network device detects the dedicated pilot, the network device clearly knows that the data is sent by the terminal, thereby effectively avoiding pilot collision.

In addition, a resource is preset in grant-free transmission. Therefore, to reduce detection complexity, when needing to perform grant-free transmission, a terminal usually uses a preset fixed transmission parameter, namely, a fixed modulation and coding scheme (MCS). Once the terminal needs to adjust the MCS, the terminal needs to carry addition control information to notify the network device of a used MCS during uplink transmission, consuming valuable uplink air interface resources.

SUMMARY

Embodiments provide a grant-free transmission method, a terminal, and a network device, so that the terminal can notify the network device of a used transmission parameter without sending additional control information, thereby saving uplink air interface resources of grant-free transmission.

According to a first aspect, a grant-free transmission method is provided, wherein the method includes: receiving, by a terminal, information that is about P dedicated transmission resources used for grant-free transmission and that is sent by a network device, where P is a positive integer and P≥2; selecting, by the terminal, one adapted transmission resource from the P dedicated transmission resources; and performing, by the terminal, grant-free transmission by using the adapted transmission resource and a transmission parameter set corresponding to the adapted transmission resource. By using the method, the terminal can be allocated a plurality of dedicated transmission resources before performing the grant-free transmission, where the plurality of dedicated transmission resources correspond to different transmission parameter sets, so that the terminal adjusts a transmission parameter without sending a dedicated control channel and does not need to send an ID of the terminal, thereby effectively saving valuable uplink air interface resources.

Optionally, in an implementation of the first aspect, the dedicated transmission resource includes at least one of the following: a pilot, a codebook, a signature sequence, and a time-frequency resource.

Optionally, in an implementation of the first aspect, the transmission parameter set includes at least one of the following parameters: a modulation and coding scheme, a power control parameter, a redundancy version, and a transport block size.

Optionally, in an implementation of the first aspect, the dedicated transmission resource is in a one-to-one correspondence with the transmission parameter set.

Optionally, in an implementation of the first aspect, the selecting, by the terminal, one adapted transmission resource from the P dedicated transmission resources is specifically: selecting, as the adapted transmission resource based on channel conditions and QoS requirements, a dedicated transmission resource corresponding to a best-matched transmission parameter set in P transmission parameter sets corresponding to the P dedicated transmission resources.

Optionally, in an implementation of the first aspect, the terminal further receives common transmission resource information sent by the network device.

According to a second aspect, a grant-free transmission method is provided, wherein the method includes: sending, by a network device to a terminal, information about P dedicated transmission resources used for grant-free transmission, where P is a positive integer and P≥2; and detecting, by the network device, the dedicated transmission resource, and if grant-free transmission is detected, detecting data based on a transmission parameter set corresponding to the dedicated transmission resource. In this manner, during receiving, the network device can implicitly determine the terminal that performs the grant-free transmission, and does not require an explicit terminal ID, thereby saving uplink air interface resources.

Optionally, in an implementation of the second aspect, the dedicated transmission resource includes at least one of the following: a pilot, a codebook, a signature sequence, and a time-frequency resource.

Optionally, in an implementation of the second aspect, the transmission parameter set includes at least one of the following parameters: a modulation and coding scheme, a power control parameter, a redundancy version, and a transport block size.

Optionally, in an implementation of the second aspect, the dedicated transmission resource is in a one-to-one correspondence with the transmission parameter set.

Optionally, in an implementation of the second aspect, the P dedicated transmission resources are selected from M dedicated transmission resources, where M is a positive integer and M≥P.

Optionally, in an implementation of the second aspect, the network device further sends common transmission resource information.

According to a third aspect, a terminal is provided, wherein the terminal device may be configured to perform processes performed by the terminal device in the foregoing grant-free transmission method according to the first aspect and various implementations. The terminal includes: a receiving unit, configured to receive information that is about P dedicated transmission resources used for grant-free transmission and that is sent by a network device, where P is a positive integer and P≥2; a processing unit, configured to determine an adapted transmission resource and a transmission parameter set corresponding to the adapted transmission resource; and a sending unit, configured to send a pilot and data to the network device based on the adapted transmission resource and the transmission parameter set.

According to a fourth aspect, a network device is provided, wherein the network device may be configured to perform processes performed by the network device in the foregoing grant-free transmission method according to the second aspect and various implementations. The network device includes: a sending unit, configured to send, to a terminal, information about P dedicated transmission resources used for grant-free transmission, where P is a positive integer and P≥2; a receiving unit, configured to receive data of grant-free transmission and a pilot of the data on a grant-free transmission resource; and a processing unit, configured to: detect the dedicated transmission resource, and if grant-free transmission is detected, detect the data based on a transmission parameter set corresponding to the dedicated transmission resource.

According to a fifth aspect, a terminal device is provided, wherein the terminal device may be configured to perform processes performed by the terminal device in the foregoing grant-free transmission method according to the first aspect and various implementations. The terminal device includes a processor, a transmitter, and a receiver. The receiver is configured to receive information that is about P dedicated transmission resources used for grant-free transmission and that is sent by a network device, where P is a positive integer and P≥2. The processor is configured to determine an adapted transmission resource and a transmission parameter set corresponding to the adapted transmission resource. The transmitter is configured to send a pilot and data to the network device based on the adapted transmission resource and the transmission parameter set.

According to a sixth aspect, a network device is provided, wherein the network device may be configured to perform processes performed by the network device in the foregoing grant-free transmission method according to the second aspect and various implementations. The network device includes a processor, a transmitter, and a receiver. The transmitter is configured to send, to a terminal, information about P dedicated transmission resources used for grant-free transmission, where P is a positive integer and P≥2. The receiver is configured to receive data of grant-free transmission and a pilot of the data on a grant-free transmission resource. The processor is configured to: detect the dedicated transmission resource, and if grant-free transmission is detected, detect the data based on a transmission parameter set corresponding to the dedicated transmission resource.

According to a seventh aspect, a computer-readable storage medium is provided, wherein the computer-readable storage medium stores a program, and the program enables a terminal device to perform the foregoing grant-free transmission method according to any one of the first aspect or various implementations thereof.

According to an eighth aspect, a computer-readable storage medium is provided, wherein the computer-readable storage medium stores a program, and the program enables a network device to perform the foregoing grant-free transmission method according to any one of the second aspect or various implementations thereof.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Figure 1:
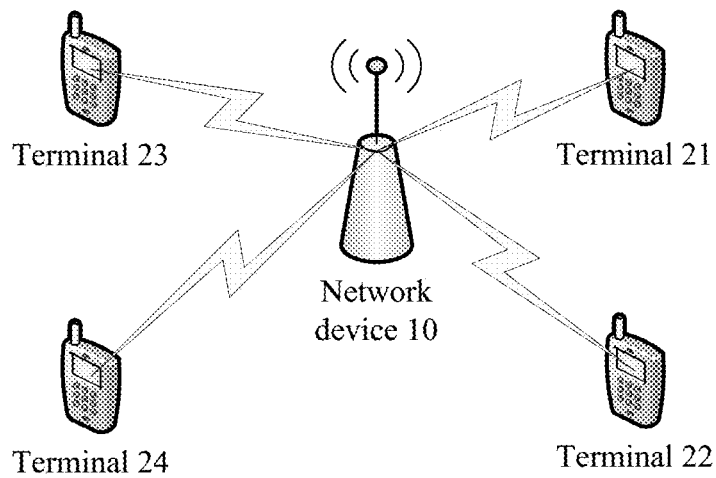
FIG. 1 is a schematic architectural diagram of a communications system according to an embodiment of the present invention.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from a component interacting with another component in a local system, a distributed system, and/or across a network such as the Internet interacting with other systems by using the signal).

It should be understood that, the technical solutions of the embodiments of the present invention may be applied to various communications systems, such as a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD), a Universal Mobile Telecommunications System (UMTS), and a future 5G communications system.

Embodiments of the present invention describe a terminal with reference to the embodiments. The terminal may also be user equipment (UE), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, WLL) station, a personal digital assistant (Personal Digital Assistant, "PDA" for short), a handheld device having a wireless communication function, a computing device or another processing device connected to a wireless modem, an in-vehicle device, a wearable device, a terminal in a future 5G network, a terminal in a future evolved PLMN network, or the like.

Embodiments of the present invention describe a network device with reference to the embodiments. The network device may be a device configured to communicate with a terminal. For example, the network device may be a base transceiver station (BTS) in a GSM system or a CDMA system, or a NodeB (NB) in a WCDMA system, or an evolved NodeB (eNB or eNodeB) in an LTE system; or the network device may be a relay station, an access point, an in-vehicle device, a transmission point, a wearable device and a network side device in a future 5G network, or a network device in a future evolved PLMN network, or any device that undertakes a network function.

FIG. 1 is a schematic architectural diagram of a communications system according to an embodiment of the present invention. As shown in FIG. 1, the communications system may include a network device 10, a terminal 21, a terminal 22, a terminal 23, and a terminal 24 that are wirelessly connected. The terminal 21, the terminal 22, the terminal 23, and the terminal 24 access the entire wireless communications system via the network device 10.

A network may be a public land mobile network (PLMN), or a device-to-device (D2D) network, or a machine-to-machine/man (M2M) network, or another network. FIG. 1 is merely a simplified schematic diagram of an example. The network may further include another network device and another terminal, which are not drawn in FIG. 1.

Data may include service data or signaling data. A transmission resource for grant-free transmission may include but is not limited to one or more combinations of the following resources: a time domain resource such as a radio frame, a subframe, or a symbol; a frequency domain resource such as a subcarrier or a resource block; a space domain resource such as a transmit antenna or a beam; a code domain resource such as a sparse code multiple access (SCMA) codebook group, a low density signature (LDS) group, or a CDMA code group; an uplink pilot resource; an interleaving resource; and a channel coding scheme.

The foregoing transmission resources may be used for transmission performed based on the following control mechanisms, which include but are not limited to: uplink power control, for example, uplink transmit power upper-limit control, represented by an uplink power control parameter; modulation and a coding scheme MCS setting, for example, settings of a transport block size, a code rate, and a modulation order, represented by parameters such as a transport block size and an MCS; and a retransmission mechanism, for example, a hybrid automatic repeat request (HARQ) mechanism or redundancy version (RV) control, represented by a parameter such as an RV version.

Figure 2:
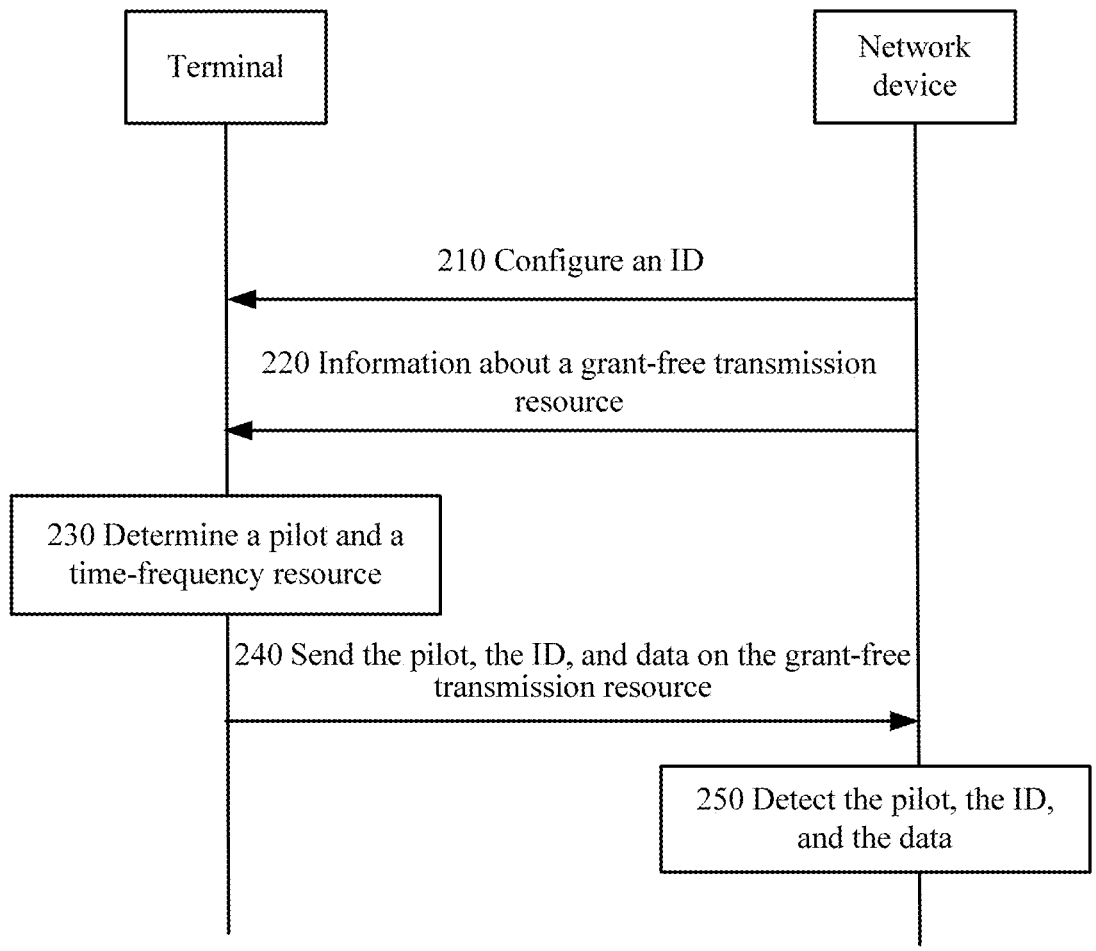
FIG. 2 is a flowchart of conventional grant-free transmission.
Figure 3:
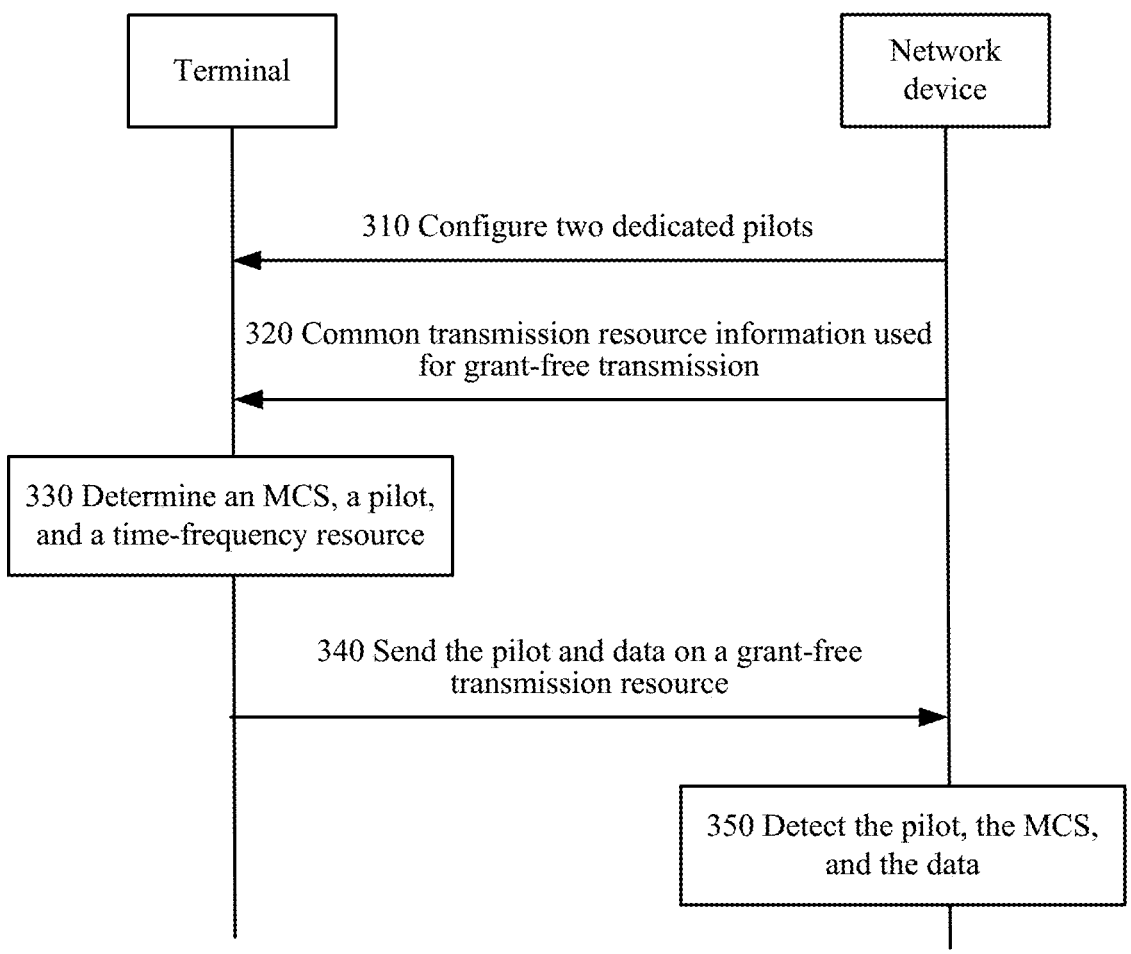
FIG. 3 is a flowchart of grant-free transmission according to an embodiment of the present invention.

FIG. 2 shows an existing conventional grant-free transmission procedure, while FIG. 3 shows an improved grant-free transmission procedure in this application. It should be noted that only parts related to this application are shown, and procedures such as signaling interworking required for establishing an ECO state are not shown.

As shown in FIG. 2, in step 210, a network device configures an ID (identity) for a terminal. The ID may be similar to a cell radio network temporary identifier (C-RNTI) in an LTE system, or may be another identification manner of distinguishing between different terminals within a service range of the network device, for example, a group number in multicast broadcast communication. The process usually occurs in a process in which the terminal accesses the network device, or may occur when the terminal and the network device perform capability negotiation to determine that grant-free transmission needs to be performed.

Step 220: The network device notifies the terminal of transmission resource information used for grant-free transmission. Generally, the network device notifies the served terminal of the information in a broadcast manner.

Step 230: Before initiating grant-free transmission, the terminal selects a pilot and a time-frequency resource from transmission resources corresponding to the received transmission resource information used for grant-free transmission.

Step 240: After to-be-transmitted data and the ID are encoded and modulated based on a preset MCS used for grant-free transmission, send content, including but not limited to the pilot, the ID, and the data, on the grant-free transmission resource determined in step 230. Generally, the ID and the data are combined for encoding.

Step 250: The network device first detects the pilot on the grant-free transmission resource, then detects a channel based on the pilot, and then detects the ID and the data.

As described above, a time for the grant-free transmission is not fixed, and therefore the MCS cannot be determined in real time. Therefore, a solution is to use a fixed MCS. However, this causes the following problem: Even if a current channel condition is very good, the terminal cannot use a higher-order MCS, and therefore resources cannot be saved. Conversely, even if a current channel condition is very poor, the terminal cannot use a lower-order MCS to improve reliability, and therefore cannot perform correct transmission, causing unwanted retransmission. Another solution is that the terminal uses a real-time MCS. However, in this solution, the terminal is required to carry additional control information to indicate the MCS. In this case, valuable uplink air interface resources are wasted, and during detection of the grant-free transmission, the network device needs to detect three parts: a pilot, the control information, and data, causing an unwanted delay. In addition, how to ensure detection of the control information is also a problem.

To resolve this problem, this application proposes that at least two dedicated transmission resources (without loss of generality, two pilots are used as an example in all the following descriptions) are configured for each terminal, so that an MCS can be adaptively adjusted in grant-free transmission without causing uplink transmission of additional control signaling. The two pilots are dedicated to the terminal, cannot be reused by another terminal, and therefore also undertake a terminal ID function actually. The two pilots correspond to different MCSs. For example, a pilot 1 configured for a terminal A indicates that a QPSK modulation scheme and a code rate of ⅓ are used, and a pilot 2 indicates that a 16QAM modulation scheme and a code rate of ½ are used; and a pilot 3 configured for a terminal B indicates that a QPSK modulation scheme and a code rate of ⅓ are used, and a pilot 4 indicates that a 16QAM modulation scheme and a code rate of ½ are used. In other words, in such a configuration manner, grant-free transmission can support two different MCSs. A specific process is shown in FIG. 3.

Step 31o: A network device configures two dedicated pilots for a terminal, where the two pilots correspond to different MCSs. The two pilots are dedicated to the terminal and are not released until the terminal enters a grant-free transmission mode. After receiving the two dedicated pilots, the terminal obtains two available MCSs based on a correspondence between the pilot and the MCS. The two dedicated pilots also undertake an ID function in a sense, and therefore it may even be considered that two IDs are configured for the terminal.

Step 320: The network device notifies the terminal of information about a common transmission resource used for grant-free transmission. Generally, the network device notifies the served terminal of the information in a broadcast manner. The transmission resource herein is usually randomly selected by the terminal. The common transmission resource herein is a transmission resource that can be occupied by all terminals that perform grant-free transmission.

Step 330: Before initiating grant-free transmission, the terminal selects a best-matched MCS from two MCSs based on current channel conditions (including information such as a path loss, small-scale fading, and an interference status), QoS (Quality of Service) requirements, and a common transmission resource corresponding to the received information about the resource used for grant-free transmission, and determines, based on the selected MCS, a pilot corresponding to the MCS.

Step 340: After being encoded and modulated based on the selected MCS, to-be-transmitted data is transmitted together with the selected pilot to the network device on a selected time-frequency resource. Because the pilot is bound to the terminal, ID information does not need to be separately transmitted during each transmission in this solution, thereby effectively saving uplink air interface resources.

Step 350: The network device first blindly detects a pilot on a grant-free transmission resource, and if the pilot is detected, it indicates that there is grant-free transmission, and the network device may determine a terminal that performs grant-free transmission, determine an MCS of received data based on a correspondence between the pilot and the MCS, and then detect the data.

The foregoing flowchart is merely an example, and actually, the method may include but is not limited to the following implementations. For example:

Manner 1: In addition to two different MCSs, the two pilots may correspond to two different transmission parameter sets. The transmission parameter set includes but is not limited to the following parameters: an MCS, an uplink power control parameter, an RV version, and/or a transport block size. Once the terminal determines a pilot used for uplink transmission, it means that a transmission parameter set corresponding to the pilot is selected. Different parameter sets have at least one different parameter. Certainly, the transmission parameter set may further include more parameters used for transmission.

Manner 2: Different configurations are performed based on different service types of different terminals. In the foregoing example, the pilot 3 allocated to the terminal B indicates that QPSK modulation and a code rate of ⅓ are used, and the pilot 4 indicates that QPSK modulation and a code rate of ½ are used. In this way, each terminal still supports only two MCSs (or uplink power control parameters, or RV versions, or transport block sizes, or the like, where the MCSs are merely an example), but entire grant-free transmission supports three MCSs. By analogy, N pilots may be divided into M groups, each group corresponds to one MCS, and a total of M MCSs are supported. In this way, only P groups need to be selected from different pilot groups based on QoS, and one pilot is selected from each of the P groups and is configured for a terminal. In this way, each terminal may support P MCSs (in this example, P=2), where P, M, and N each are a positive integer, and 2≤P≤M≤N.

Manner 3: In this example, two pilots uniquely correspond to one terminal. Alternatively, two different dedicated codebooks such as SCMA codebooks or CDMA sequences, two different signature sequences, or different transmission resources of other types may be allocated to the terminal, to ensure that at least two sets of different transmission parameters (which include but are not limited to MCSs, power control parameters, RV versions, and/or transport block sizes) are available when the terminal performs grant-free transmission. In addition, the two different transmission parameters each are transparent to the network device. In other words, complexity of performing grant-free transmission detection by the network device is not increased. Similarly, alternatively, the terminal may be allocated different time-frequency resources to correspond to different transmission parameters. For ease of description and considering that these transmission resources (which include but are not limited to a pilot, a codebook, a signature sequence, and/or a time-frequency resource location) are separately allocated to one terminal, the transmission resources may be referred to as dedicated transmission resources. In an entire communications system, there may be M dedicated transmission resources, and the M dedicated transmission resources are in a one-to-one correspondence with M transmission parameter sets. Each transmission parameter set includes but is not limited to the following parameters: an MCS, a power control parameter, an RV version, and/or a transport block size of a dedicated transmission resource. The network device may select P dedicated transmission resources from the M dedicated transmission resources and configure the P dedicated transmission resources for the terminal, where P and M are positive integers and $2 \leq P \leq M$.

In conclusion, provided that each dedicated transmission resource corresponds to one transmission parameter set and only one terminal, and each terminal corresponds to P dedicated transmission resources, to be specific, is allocated the P dedicated transmission resources, the terminal may select, based on channel conditions and QoS, a proper transmission parameter from P transmission parameters corresponding to the P dedicated transmission resources to perform grant-free transmission. Correspondingly, the network device first detects existence of grant-free transmission based on the dedicated transmission resources. For example, when the dedicated transmission resource is a pilot, provided that the dedicated pilot is detected, it indicates that there is grant-free transmission. For another example, when the dedicated transmission resource is a time-frequency resource location, provided that a pilot at the dedicated time-frequency resource location is detected, it indicates that there is grant-free transmission, where both P and M are positive integers and $2 \leq P \leq M$. Then the network device may determine, based on detected transmission resource information, a transmission parameter set and a terminal that performs grant-free transmission, and detect corresponding data. It should be noted that step 320 may even be omitted if all transmission resources for grant-free transmission are configured for each terminal in a form of the dedicated transmission resources in step 310.

Manner 4: If the network device can form a plurality of beams through beamforming (Beamforming), and the beams can be independently distinguished from each other, the transmission resources in the foregoing example and Manners 1, 2, and 3 may be multiplexed in the beams at the same time.

Manner 5: There is further an alternative method for selecting two transmission parameter sets. To be specific, each terminal is allocated only one dedicated pilot, but during specific transmission, whether a first transmission parameter set or a second transmission parameter set is selected may be indicated by sending the pilot or a conjugate (or an opposite) of the pilot. Correspondingly, when the network device blindly detects each pilot, if the pilot is not detected, the network device further needs to detect a conjugate (or an opposite) of the pilot.

It should be understood that sequence numbers of the foregoing processes do not mean execution sequences. The execution sequences of the processes should be determined based on functions and internal logic of the processes, and should not be construed as any limitation on the implementation processes of the embodiments of the present invention. In addition, a correspondence between a transmission parameter set and a transmission resource is pre-agreed on by the network device and the terminal, or may be specified by a protocol, or may be notified by the network device when the terminal accesses the network device, or may be notified by the network device in a broadcast manner. Usually, it is preferable that the correspondence is specified by the protocol.

Apparently, because each terminal needs to be allocated a plurality of dedicated transmission resources, considering an available pilot resource, the method is more applicable to a URLLC service, but it does not mean that the method cannot be applied to another service.

The following describes a terminal and a network device in grant-free transmission according to the embodiments of the present invention with reference to FIG. 4 to FIG. 9. The technical features described in the foregoing method embodiment are applicable to the following apparatus embodiments.

Figure 4:
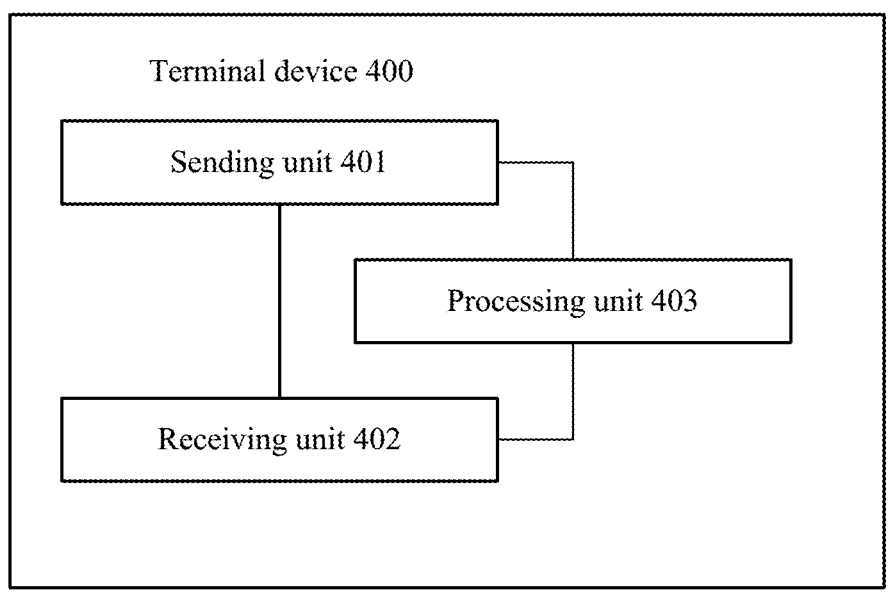
FIG. 4 is a schematic structural diagram of a terminal according to an embodiment of the present invention.

FIG. 4 shows a terminal 400 according to an embodiment of the present invention. As shown in FIG. 4, the terminal 400 includes a receiving unit 402 configured to receive information that is about P dedicated transmission resources used for grant-free transmission and that is sent by a network device, where P is a positive integer and $P \geq 2$; a processing unit 403 configured to select, as an adapted transmission resource based on channel conditions and QoS requirements, a dedicated transmission resource corresponding to a best-matched transmission parameter set in P transmission parameter sets corresponding to the P dedicated transmission resources; and a sending unit 401 configured to send a pilot and data to the network device based on the adapted transmission resource and the transmission parameter set.

Optionally, transmission resources include a dedicated transmission resource and a common transmission resource.

Optionally, the information about the dedicated transmission resource includes but is not limited to a pilot, a codebook, a signature sequence, and/or a time-frequency resource location.

Optionally, a transmission parameter set includes but is not limited to an MCS, a power control parameter, an RV version, and/or a transport block size of a dedicated transmission resource.

Optionally, the dedicated transmission resource is in a one-to-one correspondence with the transmission parameter set.

Optionally, the receiving unit 402 is further configured to receive common transmission resource information.

Figure 5:
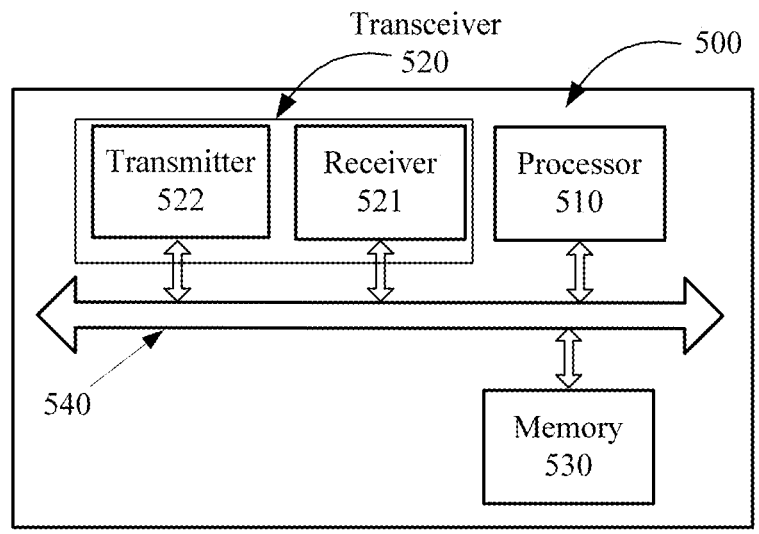
FIG. 5 is a schematic structural diagram of a terminal according to an embodiment of the present invention.

It should be noted that in this embodiment of the present invention, the sending unit 401 may be implemented by a transmitter, and the receiving unit 402 may be implemented by a receiver. As shown in FIG. 5, a terminal 500 may include a processor 510, a transceiver 520, and a memory 530. The transceiver 520 may include a receiver 521 and a transmitter 522, and the memory 530 may be configured to store code or the like executed by the processor 510. Components in the terminal 500 are coupled together by using a bus system 540. In addition to a data bus, the bus system 540 further includes a power bus, a control bus, a status signal bus, and the like.

The receiver 521 is configured to receive information that is about P dedicated transmission resources used for grant-free transmission and that is sent by a network device, where P is a positive integer and P≥2.

The processor 510 is configured to select, as an adapted transmission resource based on channel conditions and QoS requirements, a dedicated transmission resource corresponding to a best-matched transmission parameter set in P transmission parameter sets corresponding to the P dedicated transmission resources.

The transmitter 522 is configured to send a pilot and data to the network device based on the adapted transmission resource and the transmission parameter set.

Optionally, transmission resources include a dedicated transmission resource and a common transmission resource.

Optionally, the information about the dedicated transmission resource includes but is not limited to a pilot, a codebook, a signature sequence, and/or a time-frequency resource location.

Optionally, the transmission parameter set includes but is not limited to an MCS, a power control parameter, an RV version, and/or a transport block size of a dedicated transmission resource.

Optionally, the dedicated transmission resource is in a one-to-one correspondence with the transmission parameter set.

Optionally, the receiver 521 is further configured to receive common transmission resource information.

Figure 6:
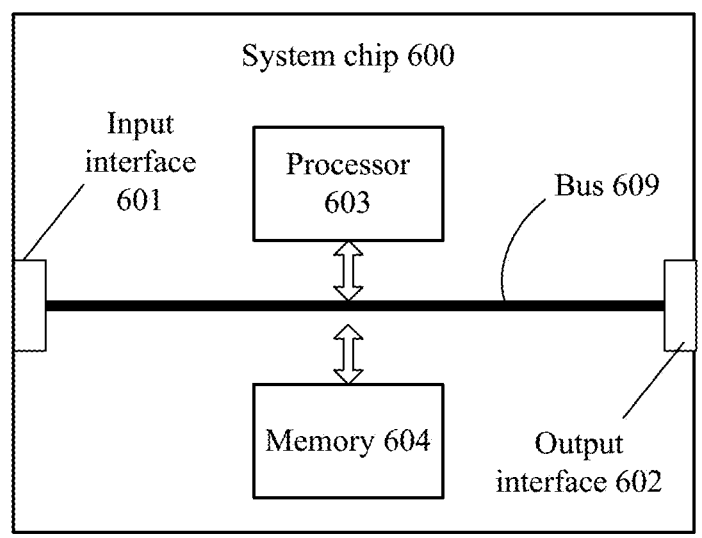
FIG. 6 is a schematic structural diagram of a system chip of a terminal according to an embodiment of the present invention.

FIG. 6 is a schematic structural diagram of a system chip 600 according to an embodiment of the present invention. In FIG. 6, the system chip 600 includes an input interface 601, an output interface 602, at least one processor 603, and a memory 604. The input interface 601, the output interface 602, the processor 603, and the memory 604 are connected by using a bus 609. The processor 603 is configured to execute code in the memory 604. When the code is executed, the processor 603 implements the method performed by the terminal in the foregoing embodiment.

The terminal 400 shown in FIG. 4, the terminal device 500 shown in FIG. 5, or the system chip 600 shown in FIG. 6 can implement various processes implemented by the terminal in the foregoing embodiment. Details are not described herein again to avoid repetition.

Figure 7:
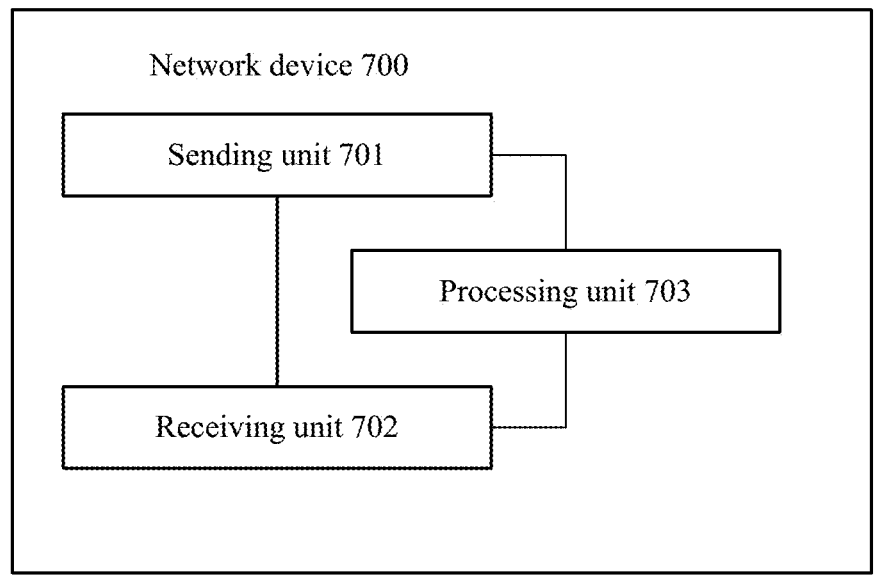
FIG. 7 is a schematic structural diagram of a network device according to an embodiment of the present invention.

FIG. 7 shows a network device 700 according to an embodiment of the present invention. As shown in FIG. 7, the network device 700 includes a sending unit 701 configured to send, to a terminal in a unicast manner, information about P dedicated transmission resources used for grant-free transmission, where P is a positive integer and P≥2, a receiving unit 702, configured to receive data of grant-free transmission and a pilot of the data on a grant-free transmission resource and a processing unit 703, configured to: select the P dedicated transmission resources from M dedicated transmission resources, and send the information about the P dedicated transmission resources to the sending unit 701; and further configured to: detect the dedicated transmission resource, and if grant-free transmission is detected, detect the data based on a transmission parameter set corresponding to the dedicated transmission resource.

Optionally, the information about the dedicated transmission resource includes but is not limited to a pilot, a codebook, a signature sequence, and/or a time-frequency resource location.

Optionally, the transmission parameter set includes but is not limited to an MCS, a power control parameter, an RV version, and/or a transport block size of a dedicated transmission resource.

Optionally, the dedicated transmission resource is in a one-to-one correspondence with the transmission parameter set.

Optionally, the sending unit 701 is further configured to send common transmission resource information in a broadcast manner.

Figure 8:
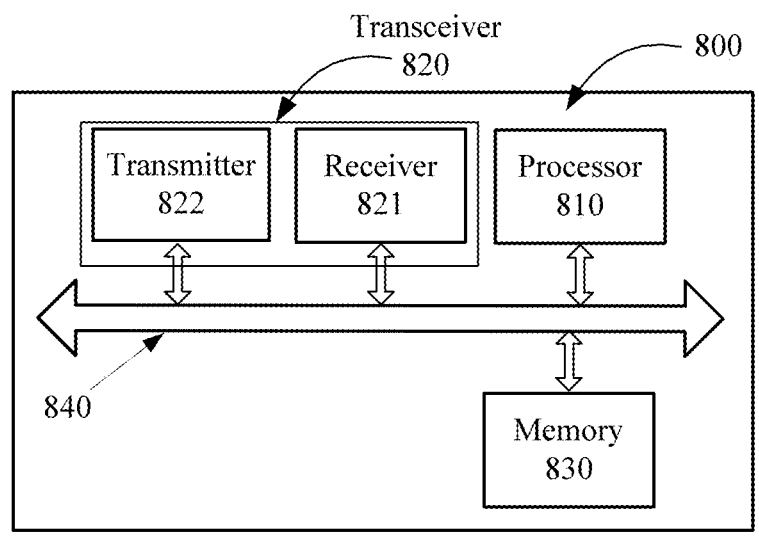
FIG. 8 is a schematic structural diagram of a network device according to an embodiment of the present invention.

It should be noted that in this embodiment of the present invention, the sending unit 701 may be implemented by a transmitter, and the receiving unit 702 may be implemented by a receiver. As shown in FIG. 8, a network device 800 may include a processor 810, a transceiver 820, and a memory 830. The transceiver 820 may include a receiver 821 and a transmitter 822, and the memory 830 may be configured to store code or the like executed by the processor 810. Components in the network device 800 are coupled together by using a bus system 840. In addition to a data bus, the bus system 840 further includes a power bus, a control bus, a status signal bus, and the like.

The transmitter 822 is configured to send, to a terminal in a unicast manner, information about P dedicated transmission resources used for grant-free transmission, where P is a positive integer and P≥2.

The receiver 821 is configured to receive data of grant-free transmission and a pilot of the data on a grant-free transmission resource.

The processor 810 is configured to: select the P dedicated transmission resources from M dedicated transmission resources, and send the information about the P dedicated transmission resources to the transmitter 822; and further configured to: detect the dedicated transmission resource, and if grant-free transmission is detected, detect the data based on a transmission parameter set corresponding to the dedicated transmission resource.

Optionally, transmission resources include a dedicated transmission resource and a common transmission resource.

Optionally, the information about the dedicated transmission resource includes but is not limited to a pilot, a codebook, a signature sequence, and/or a time-frequency resource location.

Optionally, a transmission parameter set includes but is not limited to an MCS, a power control parameter, an RV version, and/or a transport block size of a dedicated transmission resource.

Optionally, the dedicated transmission resource is in a one-to-one correspondence with the transmission parameter set.

Optionally, the sending unit 701 is further configured to send common transmission resource information in a broadcast manner.

Figure 9:
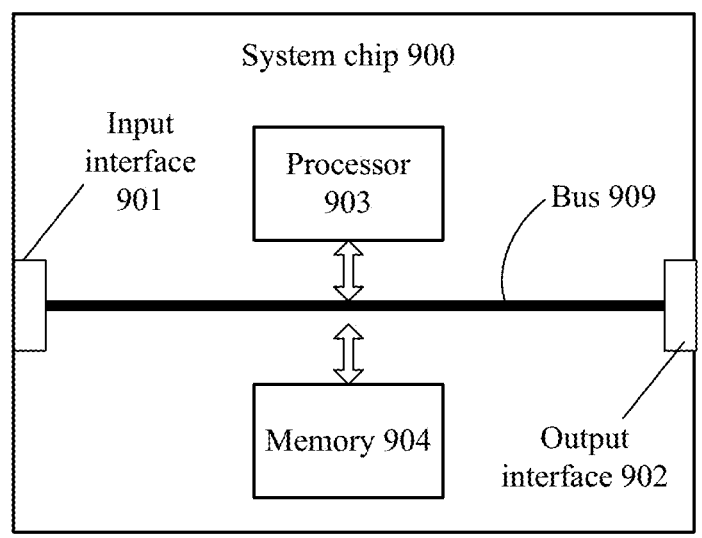
FIG. 9 is a schematic structural diagram of a system chip of a network device according to an embodiment of the present invention.

FIG. 9 is a schematic structural diagram of a system chip 900 according to an embodiment of the present invention. In FIG. 9, the system chip 900 includes an input interface 901, an output interface 902, at least one processor 903, and a memory 904. The input interface 901, the output interface 902, the processor 903, and the memory 904 are connected by using a bus 905. The processor 903 is configured to execute code in the memory 904. When the code is executed, the processor 903 implements the method performed by the network device in the foregoing embodiment.

The network device 700 shown in FIG. 7, the network device 800 shown in FIG. 8, or the system chip 900 shown in FIG. 9 can implement various processes implemented by the network device in the foregoing embodiment. Details are not described herein again to avoid repetition.

Further embodiments of the present invention are provided in the following. It should be noted that the numbering used in the following section does not necessarily need to comply with the numbering used in the previous sections.

1. A grant-free transmission method, wherein the method comprises receiving, by a terminal, information that is about P dedicated transmission resources used for grant-free transmission and that is sent by a network device, wherein P is a positive integer and P≥2, selecting, by the terminal, one adapted transmission resource from the P dedicated transmission resources and performing, by the terminal, grant-free transmission by using the adapted transmission resource and a transmission parameter set corresponding to the adapted transmission resource. 2. The method according to embodiment 1, wherein the dedicated transmission resource comprises at least one of the following: a pilot, a codebook, a signature sequence, and a time-frequency resource. 3. The method according to embodiment 1 or 2, wherein the transmission parameter set comprises at least one of the following parameters: a modulation and coding scheme, a power control parameter, a redundancy version, and a transport block size. 4. The method according to any one of embodiments 1 to 3, wherein the dedicated transmission resource is in a one-to-one correspondence with the transmission parameter set. 5. The method according to any one of embodiments 1 to 4, wherein the selecting, by the terminal, one adapted transmission resource from the P dedicated transmission resources is specifically: selecting, as the adapted transmission resource based on channel conditions and QoS requirements, a dedicated transmission resource corresponding to a best-matched transmission parameter set in P transmission parameter sets corresponding to the P dedicated transmission resources. 6. The method according to any one of embodiments 1 to 5, wherein the terminal further receives common transmission resource information sent by the network device.

7. A grant-free transmission method, wherein the method comprises sending, by a network device to a terminal, information about P dedicated transmission resources used for grant-free transmission, wherein P is a positive integer and P≥2 and detecting, by the network device, the dedicated transmission resource, and if grant-free transmission is detected, detecting data based on a transmission parameter set corresponding to the dedicated transmission resource. 8. The method according to embodiment 7, wherein the dedicated transmission resource comprises at least one of the following: a pilot, a codebook, a signature sequence, and a time-frequency resource. 9. The method according to embodiment 7 or 8, wherein the transmission parameter set comprises at least one of the following parameters: a modulation and coding scheme, a power control parameter, a redundancy version, and a transport block size. 10. The method according to any one of embodiments 7 to 9, wherein the dedicated transmission resource is in a one-to-one correspondence with the transmission parameter set. 11. The method according to any one of embodiments 7 to 10, wherein the P dedicated transmission resources are selected from M dedicated transmission resources, wherein M is a positive integer and M≥P. 12. The method according to any one of embodiments 7 to 11, wherein the network device further sends common transmission resource information.

13. A terminal comprising a receiver configured to receive information that is about P dedicated transmission resources used for grant-free transmission and that is sent by a network device, wherein P is a positive integer and P≥2, a processor configured to determine an adapted transmission resource and a transmission parameter set corresponding to the adapted transmission resource and a transmitter, configured to send a pilot and data to the network device based on the adapted transmission resource and the transmission parameter set. 14. The terminal according to embodiment 13, wherein the dedicated transmission resource comprises at least one of the following: a pilot, a codebook, a signature sequence, and a time-frequency resource. 15. The terminal according to embodiment 13 or 14, wherein the transmission parameter set comprises at least one of the following parameters: a modulation and coding scheme, a power control parameter, a redundancy version, and a transport block size. 16. The terminal according to any one of embodiments 13 to 15, wherein the dedicated transmission resource is in a one-to-one correspondence with the transmission parameter set. 17. The terminal according to any one of embodiments 13 to 16, wherein that the processor is specifically configured to select, as the adapted transmission resource based on channel conditions and QoS requirements, a dedicated transmission resource corresponding to a best-matched transmission parameter set in P transmission parameter sets corresponding to the P dedicated transmission resources. 18. The terminal according to any one of embodiments 13 to 17, wherein the receiver is further configured to receive common transmission resource information sent by the network device. 19. The terminal according to any one of embodiments 13 to 18, further comprising a memory, configured to store executable code.

20. A network device comprising a transmitter configured to send, to a terminal, information about P dedicated transmission resources used for grant-free transmission, wherein P is a positive integer and P≥2 and a processor configured to: detect the dedicated transmission resource, and if grant-free transmission is detected, detect data based on a transmission parameter set corresponding to the dedicated transmission resource. 21. The network device according to embodiment 20, wherein the dedicated transmission resource comprises at least one of the following: a pilot, a codebook, a signature sequence, and a time-frequency resource. 22. The network device according to embodiment 20 or 21, wherein the transmission parameter set comprises at least one of the following parameters: a modulation and coding scheme, a power control parameter, a redundancy version, and a transport block size. 23. The network device according to any one of embodiments 20 to 22, wherein the dedicated transmission resource is in a one-to-one correspondence with the transmission parameter set. 24. The network device according to any one of embodiments 20 to 23, wherein the processor is further configured to select the P dedicated transmission resources from M dedicated transmission resources, wherein M is a positive integer and M≥P. 25. The network device according to any one of embodiments 20 to 24, wherein the transmitter is further configured to send common transmission resource information. 26. The network device according to any one of embodiments 20 to 25, further comprising a memory, configured to store executable code.

27. A terminal comprising a receiving unit configured to receive information that is about P dedicated transmission resources used for grant-free transmission and that is sent by a network device, wherein P is a positive integer and P≥2, a processing unit configured to determine an adapted transmission resource and a transmission parameter set corresponding to the adapted transmission resource and a sending unit configured to send a pilot and data to the network device based on the adapted transmission resource and the transmission parameter set. 28. The terminal according to embodiment 27, wherein the dedicated transmission resource comprises at least one of the following: a pilot, a codebook, a signature sequence, and a time-frequency resource. 29. The terminal according to embodiment 27 or 28, wherein the transmission parameter set comprises at least one of the following parameters: a modulation and coding scheme, a power control parameter, a redundancy version, and a transport block size. 30. The terminal according to any one of embodiments 27 to 29, wherein the dedicated transmission resource is in a one-to-one correspondence with the transmission parameter set. 31. The terminal according to any one of embodiments 27 to 30, wherein that the processing unit is specifically configured to selected, as the adapted transmission resource based on channel conditions and QoS requirements, a dedicated transmission resource corresponding to a best-matched transmission parameter set in P transmission parameter sets corresponding to the P dedicated transmission resources. 32. The terminal according to any one of embodiments 27 to 31, wherein the receiving unit is further configured to receive common transmission resource information sent by the network device.

33. A network device comprising a sending unit configured to send, to a terminal, information about P dedicated transmission resources used for grant-free transmission, wherein P is a positive integer and P≥2, a receiving unit configured to receive data of grant-free transmission and a pilot of the data on a grant-free transmission resource and a processing unit configured to: detect the dedicated transmission resource, and if grant-free transmission is detected, detect the data based on a transmission parameter set corresponding to the dedicated transmission resource. 34. The network device according to embodiment 33, wherein the dedicated transmission resource comprises at least one of the following: a pilot, a codebook, a signature sequence, and a time-frequency resource. 35. The network device according to embodiment 33 or 34, wherein the transmission parameter set comprises at least one of the following parameters: a modulation and coding scheme, a power control parameter, a redundancy version, and a transport block size. 36. The network device according to any one of embodiments 33 to 35, wherein the dedicated transmission resource is in a one-to-one correspondence with the transmission parameter set. 37. The network device according to any one of embodiments 33 to 36, wherein the processing unit is further configured to select the P dedicated transmission resources from M dedicated transmission resources, wherein M is a positive integer and M≥P. 38. The network device according to any one of embodiments 33 to 37, wherein the sending unit is further configured to send common transmission resource information.

39. A storage medium comprising a readable storage medium and a computer program, wherein the computer program is used to implement the grant-free transmission method performed by the terminal device according to any one of embodiments 1 to 6.

40. A storage medium comprising a readable storage medium and a computer program, wherein the computer program is used to implement the grant-free transmission method performed by the network device according to any one of embodiments 7 to 12.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
sending, by a network device to a terminal, information about P dedicated transmission resources that are dedicated to the terminal, the P dedicated transmission resources being used for grant-free transmission and P being a positive integer and P≥2, wherein the P dedicated transmission resources include a first pilot and a second pilot that are dedicated to the terminal, wherein the first pilot corresponds to a first modulation and coding scheme, and wherein the second pilot corresponds to a second modulation and coding scheme different from the first modulation and coding scheme;
detecting, by the network device, a dedicated transmission resource of the P dedicated transmission resources; and
detecting, by the network device, data based on a transmission parameter set corresponding to the dedicated transmission resource that is dedicated to the terminal when the grant-free transmission is detected, wherein the transmission parameter set comprises a redundancy version corresponding to the dedicated transmission resource, wherein the dedicated transmission resource comprises the first pilot, and wherein the transmission parameter set corresponding to the dedicated transmission resource includes the first modulation and coding scheme corresponding to the first pilot.

2. The method according to claim 1, wherein the dedicated transmission resource further comprises a time-frequency resource.

3. The method according to claim 1, wherein the transmission parameter set further comprises a modulation and coding scheme, a power control parameter, or a transport block size.

4. The method according to claim 1, wherein the dedicated transmission resource is in a one-to-one correspondence with the transmission parameter set.

5. The method according to claim 1, wherein the P dedicated transmission resources are selected from M dedicated transmission resources, and wherein M is a positive integer and M≥P.

6. The method according to claim 1, further comprising sending, by the network device, common transmission resource information.

7. The method according to claim 1,
sending, by the network device to the terminal, information about a common grant-free transmission resource that is common to a plurality of terminals including the terminal, the common grant-free transmission resource being different from any of the P dedicated transmission resources.

8. The method according to claim 1,
wherein the first pilot corresponds to the redundancy version, and
wherein the dedicated transmission resource further comprises a codebook corresponding to the redundancy version or a signature sequence corresponding to the redundancy version.

9. A terminal comprising:
a receiver configured to:
receive information about P dedicated transmission resources that are dedicated to the terminal, the P dedicated transmission resources being used for grant-free transmission sent by a network device, wherein P is a positive integer and P≥2, wherein the P dedicated transmission resources include a first pilot and a second pilot that are dedicated to the terminal, wherein the first pilot corresponds to a first modulation and coding scheme, and wherein the second pilot corresponds to a second modulation and coding scheme different from the first modulation and coding scheme;
a processor configured to:
determine a dedicated transmission resource from the P dedicated transmission resources; and
determine a transmission parameter set corresponding to the dedicated transmission resource that is dedicated to the terminal, wherein the transmission parameter set comprises a redundancy version corresponding to the dedicated transmission resource, wherein the dedicated transmission resource comprises the first pilot, and wherein the transmission parameter set corresponding to the dedicated transmission resource includes the first modulation and coding scheme corresponding to the first pilot; and
a transmitter configured to send the first pilot and data to the network device based on the dedicated transmission resource that is dedicated to the terminal and the transmission parameter set.

10. The terminal according to claim 9, wherein the dedicated transmission resource further comprises a time-frequency resource.

11. The terminal according to claim 9, wherein the transmission parameter set further comprises a modulation and coding scheme, a power control parameter, or a transport block size.

12. The terminal according to claim 9, wherein the dedicated transmission resource is in a one-to-one correspondence with the transmission parameter set.

13. The terminal according to claim 9, wherein the processor is configured to determine the dedicated transmission resource and the transmission parameter corresponding to the dedicated transmission resource comprises specifically to select as the dedicated transmission resource a transmission resource based on channel conditions and QoS requirements, and wherein the dedicated transmission resource corresponds to a best-matched transmission parameter set in P transmission parameter sets corresponding to the P dedicated transmission resources.

14. The terminal according to claim 9, wherein the receiver is further configured to receive common transmission resource information sent by the network device.

15. The terminal according to claim 9, further comprising a memory configured to store executable code.

16. The terminal according to claim 9,
wherein the first pilot corresponds to the redundancy version, and
wherein the dedicated transmission resource further comprises a codebook corresponding to the redundancy version or a signature sequence corresponding to the redundancy version.

17. A network device comprising:
a transmitter configured to:
send, to a terminal, information about P dedicated transmission resources that are dedicated to the terminal, the P dedicated transmission resources being used for grant-free transmission and P being a positive integer and P≥2, wherein the P dedicated transmission resources include a first pilot and a second pilot that are dedicated to the terminal, wherein the first pilot corresponds to a first modulation and coding scheme, and wherein the second pilot corresponds to a second modulation and coding scheme different from the first modulation and coding scheme; and a processor configured to:
- detect a dedicated transmission resource of the P dedicated transmission resources; and
- detect data based on a transmission parameter set corresponding to the dedicated transmission resource that is dedicated to the terminal when the grant-free transmission is detected, wherein the transmission parameter set comprises a redundancy version corresponding to the dedicated transmission resource, wherein the dedicated transmission resource comprises the first pilot, and wherein the transmission parameter set corresponding to the dedicated transmission resource includes the first modulation and coding scheme corresponding to the first pilot.

18. The network device according to claim 17, wherein the dedicated transmission resource further comprises a time-frequency resource.

19. The network device according to claim 17, wherein the transmission parameter set further comprises a modulation and coding scheme, a power control parameter, or a transport block size.

20. The network device according to claim 17, wherein the dedicated transmission resource is in a one-to-one correspondence with the transmission parameter set.

21. The network device according to claim 17, wherein the processor is further configured to select the P dedicated transmission resources from M dedicated transmission resources, and wherein M is a positive integer and M≥P.

22. The network device according to claim 17, wherein the transmitter is further configured to send common transmission resource information.

23. The network device according to claim 17, further comprising a memory configured to store executable code.

24. The network device according to claim 17,
- wherein the first pilot corresponds to the redundancy version, and
- wherein the dedicated transmission resource further comprises a codebook corresponding to the redundancy version or a signature sequence corresponding to the redundancy version.

* * * * *

UNITED STATES PATENT AND TRADEMARK OFFICE
CERTIFICATE OF CORRECTION

Page 1 of 1

PATENT NO. : 11,153,028 B2
APPLICATION NO. : 16/400377
DATED : October 19, 2021
INVENTOR(S) : Yinggang Du It is certified that error appears in the above-identified patent and that said Letters Patent is hereby corrected as shown below:

In the Claims

Claim 7, Column 17, Line 54; delete "The method according to claim 1," and insert --The method according to claim 1, the method further comprising:--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*